(12) United States Patent
Hickman

(10) Patent No.: US 8,374,804 B2
(45) Date of Patent: Feb. 12, 2013

(54) AIRCRAFT DYNAMIC PRESSURE ESTIMATION SYSTEM AND METHOD

(75) Inventor: Alan Bruce Hickman, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 345 days.

(21) Appl. No.: 12/705,007

(22) Filed: Feb. 12, 2010

(65) Prior Publication Data

US 2011/0202291 A1   Aug. 18, 2011

(51) Int. Cl.
*G06F 19/00* (2011.01)
*G01L 15/00* (2006.01)
*B64C 13/00* (2006.01)

(52) U.S. Cl. .............................. 702/41; 73/716; 244/223

(58) Field of Classification Search .................... 702/41, 702/113; 244/99.2, 178, 223; 73/716, 736
See application file for complete search history.

(56) References Cited

U.S. PATENT DOCUMENTS

| | | | |
|---|---|---|---|
| 3,636,324 A | 1/1972 | Dommasch | |
| 3,765,624 A | 10/1973 | Kaniuka | |
| 5,351,914 A * | 10/1994 | Nagao et al. | 244/78.1 |
| 6,073,084 A | 6/2000 | Le Tron | |
| 6,140,942 A | 10/2000 | Bragg et al. | |
| 6,253,166 B1 | 6/2001 | Whitmore et al. | |
| 6,341,247 B1 | 1/2002 | Hreha et al. | |
| 6,366,835 B1 | 4/2002 | Henderson | |
| 6,578,425 B2 * | 6/2003 | Hickman | 73/716 |
| 7,213,454 B2 | 5/2007 | Schauer et al. | |
| 7,347,090 B1 | 3/2008 | Childers et al. | |
| 7,382,283 B2 | 6/2008 | Delaplace et al. | |

\* cited by examiner

*Primary Examiner* — Bryan Bui
(74) *Attorney, Agent, or Firm* — Ingrassia Fisher & Lorenz, P.C.

(57) ABSTRACT

Methods and apparatus are provided for estimating aircraft dynamic pressure. The load on the flight control surface actuator that is coupled to a flight control surface is measured. An estimate of the aircraft dynamic pressure is calculated from the measured load.

12 Claims, 2 Drawing Sheets

AIRCRAFT DYNAMIC PRESSURE ESTIMATION SYSTEM AND METHOD

TECHNICAL FIELD

The present invention generally relates to dynamic pressure measurement and, more particularly, to a system and method for calculating an estimate of aircraft dynamic pressure from flight control surface actuator load sensors.

BACKGROUND

Many modern flight control systems rely on various air data parameters, such as dynamic pressure, to calculate aircraft control commands. It is thus undesirable for the flight control system to receive inaccurate air data signals. Typically, dynamic pressure is sensed using one or more pitot tubes. Most often, a pitot tube is located on the wing or front section of an aircraft, with its opening facing forward. As aircraft airspeed varies, ram air pressure at the pitot tube opening also varies. The pressure variations can thus be used to determine and indicate aircraft airspeed.

Because the pitot tube opening faces forward, it can become blocked. The sources of potential blockage are numerous and varied, and include ice, water, volcanic ash, dirt, insects, and various other contaminants. A blocked pitot tube can cause inaccurately sensed dynamic pressure and thus, for example, inaccurate aircraft airspeed being determined and displayed. Presently, there are no back-up dynamic pressure sensors beyond the use of redundant pitot tubes, which are also susceptible to blockage. This blockage can occur on a single sensor or as a result of a common mode event such as, for example, icing or volcanic ash. In the unlikely, but possible, event of multiple pitot probe blockages or contaminations, it would be possible for valid, yet erroneous data to be used by the control laws or displayed to the flight crew.

Hence, there is a need for a system and method for determining aircraft dynamic pressure that is not susceptible to blockage by debris and various other sources. The present invention addresses at least this need.

BRIEF SUMMARY

In one embodiment, a method for estimating dynamic pressure applied to an aircraft having a flight control surface actuator coupled to a flight control surface includes measuring a load on the flight control surface actuator. An estimate of the dynamic pressure is calculated from the measured load.

In another embodiment, a system for estimating aircraft dynamic pressure includes a sensor and a processor. The sensor is configured to sense a load on a flight control surface actuator and supply actuator load signals representative thereof. The processor is coupled to receive the actuator load signals and is configured to calculate an estimate of the aircraft dynamic pressure from the sensed load.

In yet another embodiment, a system for estimating aircraft dynamic pressure includes a plurality of first flight control surface actuators, a plurality of first load sensors, a plurality of second flight control surface actuators, a plurality of second load sensors, and a processor. Each of the first flight control surface actuators is adapted to be coupled to a first aircraft flight control surface. Each of the first flight control surface actuators is further adapted to receive a controlled flow of hydraulic fluid and is configured, upon receipt of the controlled flow of hydraulic fluid, to move the first flight control surface to a control position. Each of the first load sensors is coupled to one of the first flight control surface actuators and is configured to sense a load thereon and supply first flight control surface actuator load signals representative thereof. Each of the second flight control surface actuators is adapted to be coupled to a second aircraft flight control surface. Each of the second flight control surface actuators is further adapted to receive a controlled flow of hydraulic fluid and is configured, upon receipt of the controlled flow of hydraulic fluid, to move the second flight control surface to a control position. Each of the second load sensors is coupled to one of the second flight control surface actuators and is configured to sense a load thereon and supply second flight control surface actuator load signals representative thereof. The processor is coupled to receive the first flight control surface actuator load signals and the second flight control surface actuator load signals and is configured to calculate an estimate of the aircraft dynamic pressure from the first and second flight control surface actuator load signals.

Other desirable features and characteristics of the dynamic pressure determination system and method described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
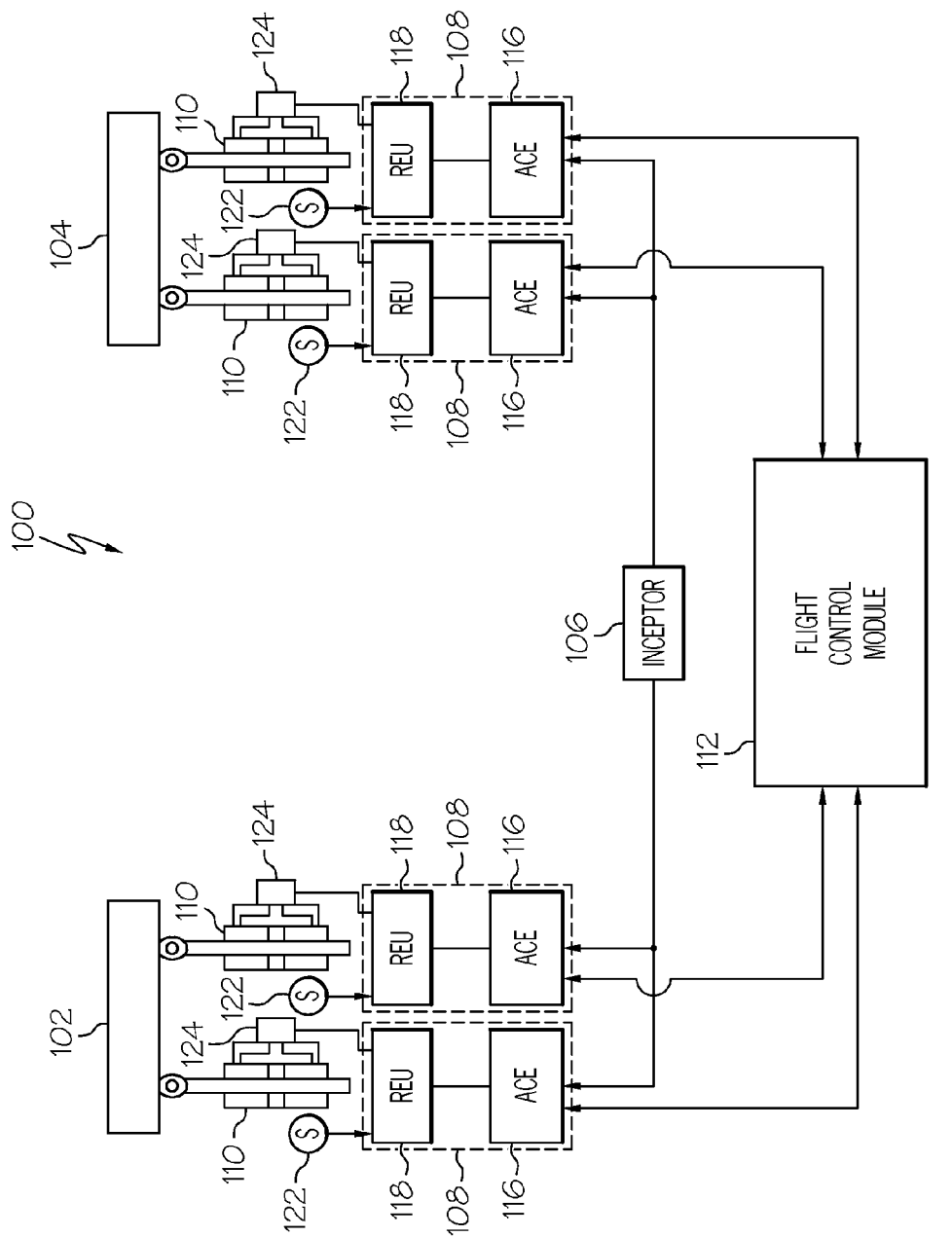
FIG. 1 is depicts a functional block diagram of a portion of an aircraft flight control system.

Referring first to FIG. 1, a functional block diagram of a portion of an aircraft flight control surface actuation system 100 is depicted. In particular, that portion of a flight control surface actuation system 100 that controls the position of two flight control surfaces—a left aileron 102 and a right aileron 104—is depicted. The depicted portion of the flight control surface actuation system 100 includes an inceptor 106, a plurality of actuator controls 108, a plurality of flight control surface actuators 110, and a flight control module 112.

The inceptor 106 is configured to move in response to an input force supplied from, for example, a pilot. One or more non-illustrated position sensors sense the position of the inceptor 106, and supply inceptor position signals representative of the sensed inceptor position. It will be appreciated that the inceptor 106 may be implemented using any one of numerous inceptor configurations including, for example, a side stick, a yoke, or a rudder pedal, just to name a few. It will additionally be appreciated that the inceptor 106 may be implemented as an active inceptor or a passive inceptor. No matter its specific implementation, the inceptor 106 supplies the inceptor position signals to the actuator controls 108.

The actuator controls 108 are each coupled to receive the inceptor position signals from the inceptor 106, and may also receive flight control augmentation data from the flight control module 112. The actuator controls 108 are each responsive to the inceptor position signals and the flight control augmentation data to generate flight control surface actuator commands. Although the actuator controls 108 may be variously configured, in the depicted embodiment each actuator control 108 includes actuator control electronics (ACE) 116 and a remote electronics unit (REU) 118. The ACEs 116 are each coupled to receive the inceptor position signals and the flight control augmentation data and are configured, in response thereto, to generate flight control surface position commands, which are supplied to one of the REUs 118.

The REUs 118 are each coupled to receive the flight control surface position commands from its associated ACE 116 and are configured, in response thereto, to supply appropriate actuator position commands to its associated flight control surface actuator 110. The REUs 118 are additionally coupled to receive one or more control surface position feedback signals from one or more non-illustrated control surface position sensors, and actuator load signals from one or more actuator load sensors 122. The REUs 118 transmit data representative of control surface position and actuator load (and information about the health of the actuator and its sensors) back to the associated ACEs 116 for subsequent transmission to the flight control module 112.

The flight control surface actuators 110 are each coupled to one of the flight control surfaces. In the depicted embodiment, two flight control surface actuators 110 are coupled to the left aileron 102 and two flight control surface actuators are coupled to the right aileron 104. It will be appreciated that this is merely exemplary of a particular embodiment. No matter the specific number of flight control surface actuators 110, each is coupled to receive the flight control surface actuator commands supplied from one of the actuator controls 108. The flight control surface actuators 110 are each configured, upon receipt of the flight control surface actuator commands, to move its associated flight control surface to the commanded control position. It will be appreciated that the flight control surface actuators 110 may be variously implemented to carry out this functionality. For example, the flight control surface actuators 110 may be implemented using any one of numerous electric, electromechanical, hydraulic, or pneumatic actuators now known or developed in the future. In the depicted embodiment, however, each flight control surface actuator is implemented using a hydraulic actuator that receives a controlled flow of hydraulic fluid via, for example, a servo-control valve 124 and, in response to the controlled flow of hydraulic fluid, moves the flight control surface to which it is coupled to the control position.

The actuator load sensors 122 that were mentioned above are each associated with one of the flight control surface actuators 110. Although FIG. 1 depicts a single actuator load sensor 122 associated with each flight control surface actuator 110, it will be appreciated that two or more actuator load sensors 122 may be associated with each flight control surface actuator 110. It will additionally be appreciated that the actuator load sensors 122 may also be variously implemented. For example, the actuator load sensors 122 may be implemented using any one of numerous know load cells, force sensors, or pressure sensors, just to name a few. In the depicted embodiment, the actuator load sensors 122 are implemented using pressure sensors. The pressure sensors 122 each sense the pressure of the hydraulic fluid in their associated flight control surface actuators 110, and supply a pressure signal representative thereof to the associated REU 118. As described above, REUs 118 transmit the pressure data (which are representative of actuator load) to the associated ACEs 116 for subsequent transmission to the flight control module 112

The flight control module 112, among various other functions, generates the above-described flight augmentation data that are supplied to the actuator controls 108. The flight control module 112 also receives the data representative of control surface position and actuator load from the ACEs 116. The flight control module 112 is configured to process the data representative of actuator load to determine the individual load on each flight control surface actuator 110 and, if necessary, supply suitable commands to the actuator controls 108 to equalize the loads on the flight control surface actuators 110 that are coupled to the same flight control surface 102, 104. The flight control module 112 is also configured to process the data representative of actuator load and calculate an estimate of the aircraft dynamic pressure from the sensed actuator load. The manner in which the flight control module 112 makes this calculation will now be described.

It is generally known that, for a given aileron position, the airload (lift) on the aft section of a wing is approximately proportional to the dynamic pressure. This is shown as follows:

$$C_P = \frac{P_{UPPER} - P_{LOWER}}{q},$$

or $$P_{UPPER} - P_{LOWER} = C_P * q,$$

where:
  $C_p$ is the local pressure coefficient,
  $P_{UPPER}$ is the local pressure on the upper surface of the wing,
  $P_{LOWER}$ is the local pressure on the lower surface of the wing, and
  q is the dynamic pressure.

It has been shown that the pressure coefficient (Cp) at an aileron 102, 104 is primarily impacted by the aileron position and is impacted very little by wing angle of attack ("alpha") near the aft section of the wing, where the ailerons 102, 104 are located. Hence, the local pressure difference ($P_{UPPER} - P_{LOWER}$) is proportional to the dynamic pressure (q) and the aileron position. Moreover, if the local pressure difference is integrated over the aileron surface, the resultant is the aileron load. Therefore, since the actuator load ($LOAD_{ACTUATOR}$) is proportional to the aileron load, it may be shown that:

$$LOAD_{ACTUATOR} = k(C_{h0} + C_{h\delta} * \delta ail) * q,$$

and thus:

$$q = \frac{LOAD_{ACTUATOR}}{k(C_{h0} + C_{h\delta} * \delta_{ail})},$$

where:
  k is the mechanical relationship between the pressure on the aileron and load in the actuator,
  $C_{h0}$ is the hinge moment coefficient at zero degrees of aileron deflection,
  $C_{h\delta}$ is the hinge moment gradient as a function of aileron position, and
  $\delta$ail is the aileron position.

Since the aileron load is sensed, via the actuator load sensors 122, the flight control module 112 may be readily configured to calculate the estimate of aircraft dynamic pressure using these data. It will be appreciated that in the depicted embodiment the flight control module 112 is additionally configured to determine the aileron load from the sensed hydraulic fluid pressure.

Figure 2:
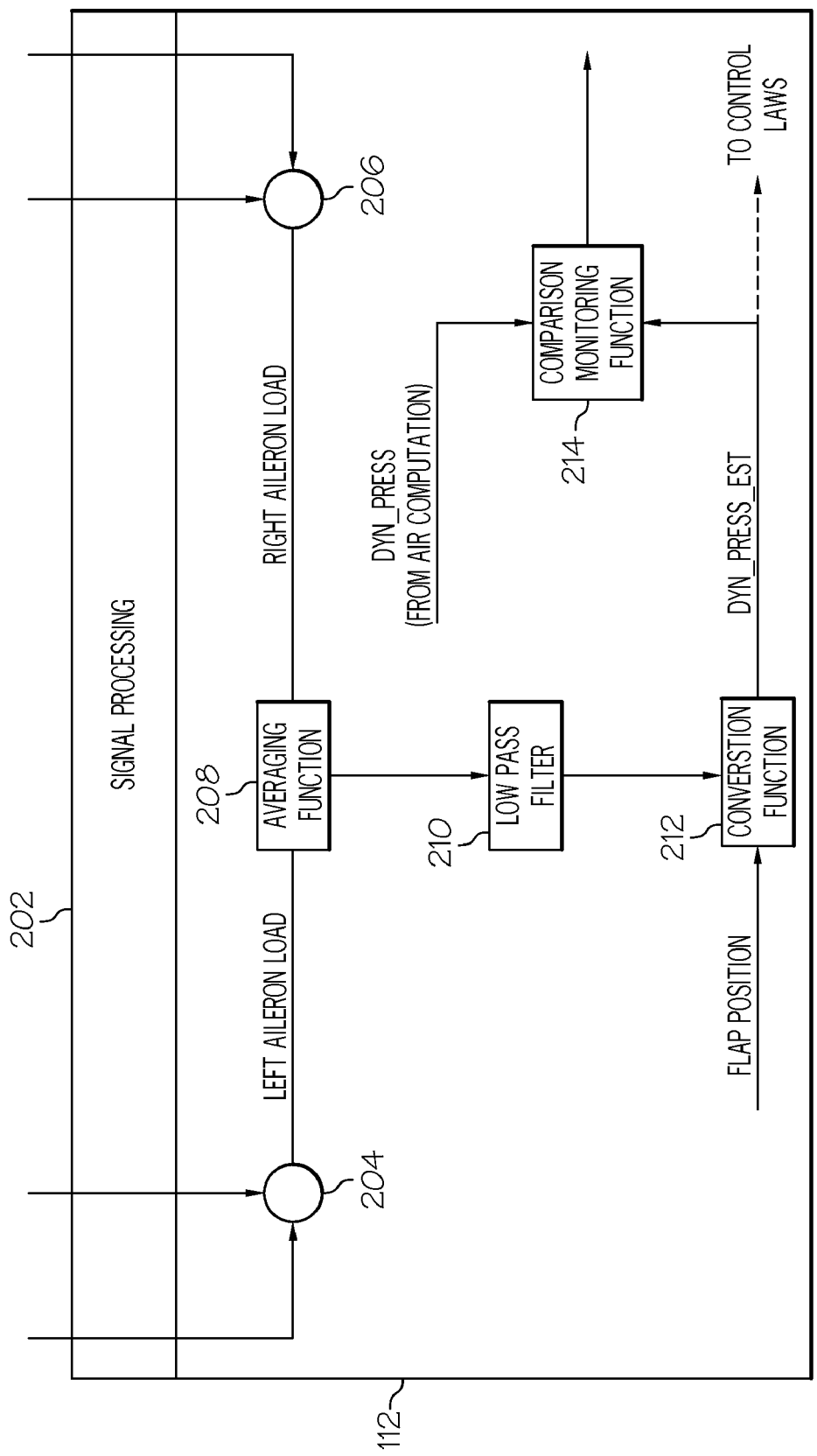
FIG. 2 depicts a functional block diagram of at least a portion of a flight control module that may be used to implement the system of FIG. 1.

Turning now to FIG. 2, a functional block diagram of at least a portion the flight control module 112 is depicted and will be described. Before doing so, however, it is noted that the flight control module 112, including each of the functional blocks depicted in FIG. 2, may be implemented using one or more general purpose processors, content addressable memory, digital signal processors, application specific integrated circuits, field programmable gate arrays, any suitable programmable logic devices, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

No matter how the flight control module 112 is specifically implemented, it is seen that it receives the actuator load signals from each of the load sensors 122 associated with the flight control surface actuators 110 on the left aileron 102 and from each of each of the load sensors 122 associated with the flight control surface actuators 110 on the right aileron. After suitable signal processing 202, a first summing function 204 sums the actuator load signals from the load sensors 122 associated with the left aileron 102 to determine the left aileron load, and a second summing function 206 sums the actuator load signals from the load sensors 122 associated with the right aileron 104 to determine the right aileron load. An averaging function 208 then averages the left and right aileron loads and, after suitable filtering by a low-pass filter 210, the average aileron load is supplied to a conversion function 212.

The conversion function 212 calculates the estimate of aircraft dynamic pressure (q) from the average aileron load. As FIG. 2 also depicts, the conversion function 212 may also receive a signal representative of aileron position. This is because the load on the aileron is also a function of the control surface position. Since the ailerons move in opposite directions to produce an aircraft rolling moment the load on one control surface increases and the load on the other surface decreases. Therefore the average load is not impacted by the surface position. However, in the event that one surface is inoperable, the dynamic pressure can be calculated based on the load and position from only a single healthy aileron.

The aircraft dynamic pressure estimate is then supplied to a comparison monitor function 214. The comparison monitor function 214 compares the aircraft dynamic pressure estimate to a directly sensed aircraft dynamic pressure value supplied from a non-illustrated pressure sensor, such as a pitot probe, via the aircraft avionics. The flight control module 112, at least in some embodiments, is further configured to supply an output signal that prohibits the use of the directly sensed dynamic pressure by at least portions of aircraft flight control software if the directly sensed dynamic pressure differs from the calculated estimate of the dynamic pressure by a predetermined magnitude. Moreover, in some embodiments, this signal may also command at least portions of the aircraft flight control software to use the calculated estimate of the dynamic pressure if the directly sensed dynamic pressure differs from the calculated estimate of the dynamic pressure by the predetermined magnitude. As FIG. 2 depicts via a dotted line, in some aircraft the dynamic pressure estimate may be used as the sole source for use by the control laws.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for estimating aircraft dynamic pressure, comprising:
    a load sensor configured to sense a load on a flight control surface actuator and supply actuator load signals representative thereof;
    a dynamic pressure sensor configured to directly sense aircraft dynamic pressure and supply dynamic pressure signals representative thereof; and
    a processor coupled to receive the actuator load signals and the dynamic pressure signals, the processor configured to:
        calculate an estimate of the aircraft dynamic pressure from the sensed load,
        compare the directly sensed dynamic pressure to the calculated estimate of the dynamic pressure,
        determine if the directly sensed dynamic pressure differs from the calculated estimate of the dynamic pressure by a predetermined magnitude, and
        prohibit use of the directly sensed dynamic pressure by aircraft flight control software if the directly sensed dynamic pressure differs from the calculated estimate of the dynamic pressure by the predetermined magnitude.

2. The system of claim 1, wherein the processor is further configured to:
    command the aircraft flight control software to use the calculated estimate of the dynamic pressure if the directly sensed dynamic pressure differs from the calculated estimate of the dynamic pressure by the predetermined magnitude.

3. The system of claim 1, wherein:
    the flight control surface actuator is a hydraulically operated actuator;
    the load sensor comprises a pressure sensor configured to sense hydraulic fluid pressure in the actuator; and
    the processor is configured to determine the load from the sensed hydraulic pressure.

4. The system of claim 1, wherein flight control surface actuator is coupled to a flight control surface, and wherein the processor calculates the estimate of the dynamic pressure using the following formula:

$$q = \frac{LOAD_{ACTUATOR}}{k(C_{h0} + C_{h\delta} * \delta_{ail})}$$

wherein:
    q is the dynamic pressure,
    $LOAD_{ACTUATOR}$ is the load on the flight control actuator, $C_{h0}$ is a hinge moment coefficient at zero degrees of aileron deflection,
$C_{h\delta}$ is a hinge moment gradient as a function of aileron position,
$\delta_{ail}$ is aileron position, and
k is mechanical relationship between load on the flight control surface and load in the actuator.

5. A system for estimating aircraft dynamic pressure, comprising:
a plurality of first flight control surface actuators, each of the first flight control surface actuators adapted to be coupled to a first aircraft flight control surface, each of the first flight control surface actuators adapted to receive actuator position commands and configured, in response thereto, to move the first flight control surface to a control position;
a plurality of first load sensors, each of the first load sensors coupled to one of the first flight control surface actuators and configured to sense a load thereon and supply first flight control surface actuator load signals representative thereof;
a plurality of second flight control surface actuators, each of the second flight control surface actuators adapted to be coupled to a second aircraft flight control surface, each of the second flight control surface actuators adapted to receive actuator position commands and configured, in response thereto, to move the first flight control surface to a control position;
a plurality of second load sensors, each of the second load sensors coupled to one of the second flight control surface actuators and configured to sense a load thereon and supply second flight control surface actuator load signals representative thereof; and
a processor coupled to receive the first flight control surface actuator load signals and the second flight control surface actuator load signals and configured to calculate an estimate of the aircraft dynamic pressure from the sensed loads.

6. The system of claim 5, wherein the processor is further configured to:
calculate an average of the sensed loads; and
use the calculated average to calculate the estimate of the aircraft dynamic pressure.

7. The system of claim 5, further comprising:
a dynamic pressure sensor configured to directly sense aircraft dynamic pressure and supply dynamic pressure signals representative thereof,
wherein the processor is coupled to receive the dynamic pressure signals and is further configured to compare the directly sensed dynamic pressure to the calculated estimate of the dynamic pressure.

8. The system of claim 7, wherein the processor is further configured to:
determine if the directly sensed dynamic pressure differs from the calculated estimate of the dynamic pressure by a predetermined magnitude; and
prohibit use of the directly sensed dynamic pressure by aircraft flight control software if the directly sensed dynamic pressure differs from the calculated estimate of the dynamic pressure by the predetermined magnitude.

9. The system of claim 8, wherein the processor is further configured to:
command the aircraft flight control software to use the calculated estimate of the dynamic pressure if the directly sensed dynamic pressure differs from the calculated estimate of the dynamic pressure by the predetermined magnitude.

10. The system of claim 5, wherein:
the first and second plurality of flight control surface actuators are each a hydraulically operated actuator;
the first and second plurality of load sensors each comprise a pressure sensor configured to sense hydraulic fluid pressure in an actuator; and
the processor is configured to determine the sensed load from the sensed hydraulic pressure.

11. The system of claim 5, wherein the processor calculates the estimate of the dynamic pressure using the following formula:

$$q = \frac{LOAD_{ACTUATOR}}{k(C_{h0} + C_{h\delta} * \delta_{ail})}$$

wherein:
q is the dynamic pressure,
$LOAD_{ACTUATOR}$ is the load on the flight control actuator,
$C_{h0}$ is a hinge moment coefficient at zero degrees of aileron deflection,
$C_{h\delta}$ is a hinge moment gradient as a function of aileron position,
$\delta_{ail}$ is aileron position, and
k is mechanical relationship between load on the flight control surface and load in the actuator.

12. A system for estimating aircraft dynamic pressure, comprising:
a load sensor configured to sense a load on a flight control surface actuator and supply actuator load signals representative thereof; and
a processor coupled to receive the actuator load signals and configured to calculate an estimate of the aircraft dynamic pressure from the sensed load,
wherein the flight control surface actuator is coupled to a flight control surface, and wherein the processor calculates the estimate of the dynamic pressure using the following formula:

$$q = \frac{LOAD_{ACTUATOR}}{k(C_{h0} + C_{h\delta} * \delta_{ail})}$$

wherein:
q is the dynamic pressure,
$LOAD_{ACTUATOR}$ is the load on the flight control actuator,
$C_{h0}$ is a hinge moment coefficient at zero degrees of aileron deflection,
$C_{h\delta}$ is a hinge moment gradient as a function of aileron position,
$\delta_{ail}$ is aileron position, and
k is mechanical relationship between load on the flight control surface and load in the actuator.

* * * * *